April 23, 1963

R. L. McILVAINE 3,086,719

MULLING AND MIXING APPARATUS

Filed Nov. 28, 1960

INVENTOR.
ROBERT L. McILVAINE

BY MASON, KOLEHMAINEN,
RATHBURN & WYSS

April 23, 1963

R. L. McILVAINE 3,086,719

MULLING AND MIXING APPARATUS

Filed Nov. 28, 1960

*INVENTOR.*
ROBERT L. McILVAINE

BY MASON, KOLEHMAINEN,
RATHBURN & WYSS

United States Patent Office 3,086,719
Patented Apr. 23, 1963

3,086,719
MULLING AND MIXING APPARATUS
Robert L. McIlvaine, Winnetka, Ill., assignor to Herbert Simpson Corporation, Chicago, Ill., a corporation of Illinois
Filed Nov. 28, 1960, Ser. No. 72,003
1 Claim. (Cl. 241—107)

The present invention relates to an improved portable mulling and mixing apparatus and, more particularly, to a portable or miniature mulling and mixing machine of the type used for pulverizing and mixing relatively small batches of materials as are required for laboratory samples and the like. One such mulling machine is shown in United States patent to B. L. Simpson, Patent No. 2,676,760, and assigned to the same assignee as the present invention.

It is desirable to have an improved muller and mixer for use in preparing small batches of material for laboratory use that will closely simulate the conditions of an actual large-sized commercial mulling machine. It is also desirable that the mulling and mixing machine be easily transported between the laboratory and the job site without the necessity of transporting a heavy and cumbersome power unit for the machine. Further, it is desirable to have a machine that will thoroughly pulverize and mix small batches of material to a uniform consistency with little or no variation throughout the batch. Moreover, it is desirable that the mulling and mixing machine be of such construction that it has no dead spaces where material is relatively stationary during operation of the machine and can build up without being pulverized and mixed.

Therefore, it is an object of the present invention to provide an improved mulling and mixing machine that will thoroughly and uniformly pulverize and mix small batches of materials as are needed for laboratory samples and the like.

Another object of the present invention is to provide an improved portable mulling and mixing machine that can be powered by and used with a standard drill press or the like.

Another object of the present invention is to provide an improved miniature mulling and mixing machine.

Another object of the present invention is to provide an improved portable mulling and mixing machine.

Another object of the present invention is to provide an improved portable mixing and mulling machine in which the material holder can be easily removed or replaced with another without affecting the muller wheel and the mixing blades or disconnecting them from the power unit, thus providing a simple method of removing the material and eliminating the necessity for cleaning out the material holder each time a new or different material is used.

Still another object of the present invention is to provide an improved muller and mixer in which substantially all of the material is continuously being moved and mixed or pulverized, and in which there are no dead spaces where material is allowed to build up or remain stationary for a period of time.

Yet another object of the present invention is to provide an improved miniature mulling and mixing machine having mulling wheels that can pivot and move at a vertical direction relative to the mixing blades while the blades are continuously maintained in close proximity to the bottom of the mixing pan.

In accordance with the present invention, the foregoing and other objects are realized by providing a portable mulling and mixing machine having a vertically positioned rotatable shaft, an independently supported material holding pan, and means for centering the pan on the axis of the main shaft. The main shaft defines a longitudinal main slot that receives a generally horizontally disposed crossarm having rotatable mulling wheels positioned thereon. The crossarm can move up and down and pivot in the main slot, and a spring is positioned axially in the slot to bias the crossarm downwardly. The main shaft also defines a pair of longitudinal slots being disposed at right angles to the main slot and communicating therewith. Pins extend from the crossarm and cooperate with the slots for preventing radial movement of the crossarm relative to the main shaft while allowing a vertical movement relative thereto. A plurality of mixing blades are fixedly positioned relative to the main shaft and rotate therewith in a plane which is in close proximity to the bottom of the material holding pan. Means are also provided for keeping the central space below the main shaft and above the bottom surface of the material holding pan devoid of material.

Further objects and advantages of the present invention will become apparent as the following description proceeds, and the features of novelty which characterize the invention will be pointed out with particularity in the claim annexed to and forming a part of this specification.

Figure 1:
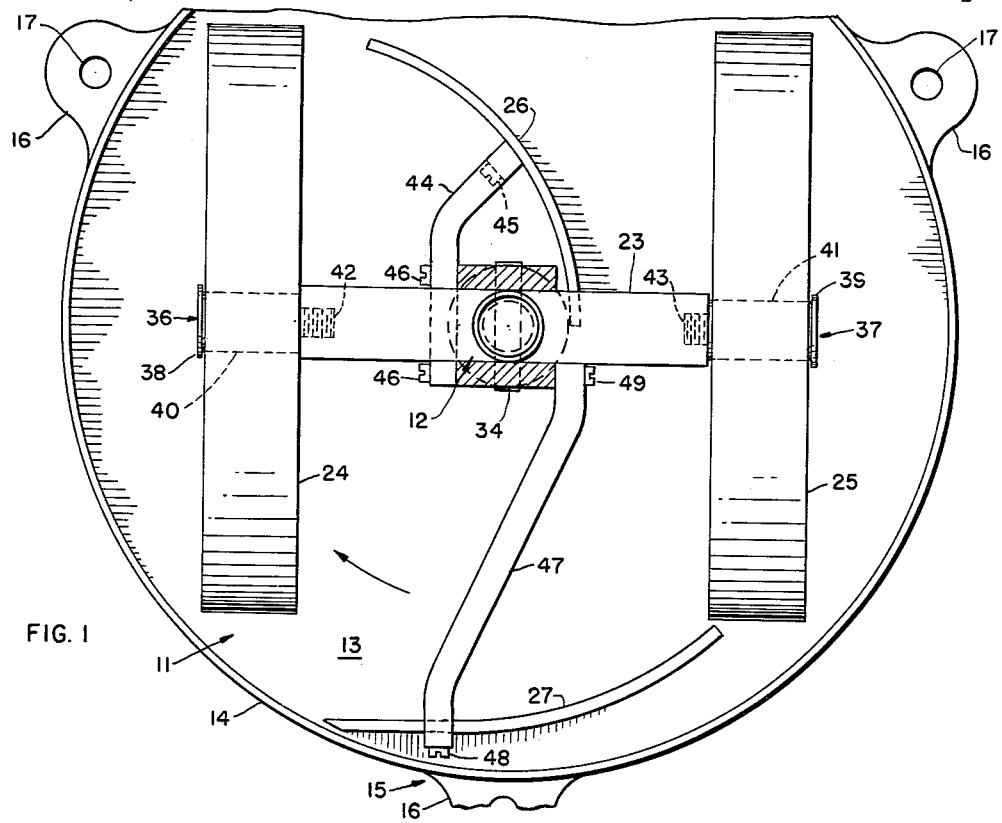
FIG. 1 is a plan view, partly in section, of a miniature mulling and mixing machine characterized by the features of the present invention.
Figure 2:
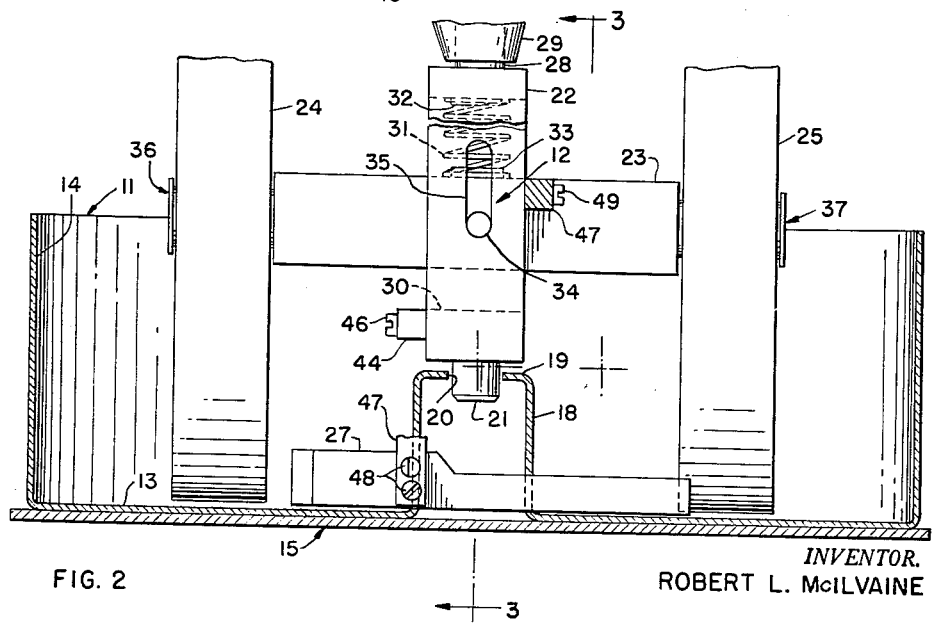
FIG. 2 is a front elevational view, partly in section, of the machine shown in FIG. 1.
Figure 3:
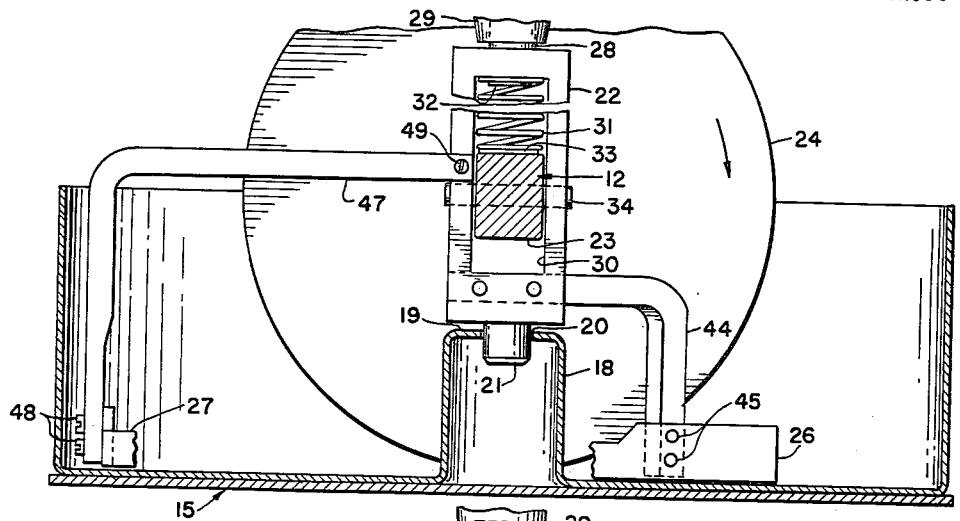
FIG. 3 is a partial side sectional elevational view of the mulling and mixing machine taken along line 3—3 of FIG. 2.

Referring now to the drawings, as illustrated in the embodiments of FIGS. 1, 2, and 3, an improved muller and mixing machine according to the present invention is comprised of a mixing pan or pan assembly, generally referred to as 11, and a mixing and mulling head assembly, generally referred to as 12. The mixing pan assembly is separate from the mixing and mulling head assembly 12 and can be supported by any suitable support independently of the mixing and mulling head assembly 12.

The mixing pan 11 is generally of cylindrical shape having a flat bottom 13 and cylindrical sides 14 joined thereto or integrally formed therewith. A supporting bottom plate 15 is disposed underneath and concentric with flat bottom 13. The supporting bottom plate 15 has a plurality of radially extending lugs 16 having apertures 17 therein disposed for use in securely fastening or mounting the mixing pan assembly 11 on the table of a drill press or other suitable mounting surface.

For the purpose of aligning the mixing pan assembly 11 with the head assembly 12, the central portion of the mixing pan 11 is provided with a raised cylindrical portion 18. In the embodiment of FIGS. 1 to 3, the raised cylindrical portion 18 has a flat top surface 19 with an aperture 20 defined in the center thereof. The muller and mixing head assembly is provided with an aligning shaft 21 of slightly smaller diameter than the aperture 20, and the aligning shaft 21 is rotatably and detachably received within said aperture 20. The muller and mixing head assembly 12 is therefore rotatably positioned relative to the mixing pan assembly 11, and the alignment shaft 21 being centered within the aperture 20 insures that the mixing pan 11 is concentric with the axis of the muller and mixing head assembly 12. Moreover, the concentric raised cylindrical portion 18 of the mixing pan assembly 11 keeps the central portion of the pan 11 devoid of material so that there will be no material building up in the center which is not being mixed or mulled continuously during operation of the machine.

The mixing and mulling head assembly 12, in addition to the aligning shaft 21, is comprised of a vertically disposed rotatable main shaft 22, a crossarm 23, mulling wheels 24 and 25, a convex inner mixer blade 26, a concave outer mixer blade 27, and other connecting parts necessary to provide successful coaction therebetween.

For the purpose of supporting and rotating the assembly 12, the main shaft 22 is provided with a round shank portion 28 which extends axially upward from the main body portion of the main shaft 22 adapted to be engaged by a standard chuck 29 of a drill press or other power unit. As the alignment shaft 21 rotates within the aperture 20 of the concentric raised cylindrical portion 18 of the mixing pan assembly 11, the mixing pan assembly 11 is centered about the rotating axis of the main shaft 22.

In order to support the crossarm 23 for vertical movement, the main shaft 22 is provided with a main longitudinal slot 30 through which the crossarm 23 is radially disposed relative to the main shaft 22. A spring 31 is longitudinally disposed in the slot 30 of the main shaft 22 and biases the crossarm 23 downwardly. The upper end of the spring 31 is held in position within the slot 30 of the main shaft 22 by a circular boss 32 positioned at the top of the slot 30 and the lower end of the spring is held by a boss 33 positioned on the top of the crossarm 23.

For the purpose of preventing the crossarm 23 from moving radially with respect to the main shaft 22 and yet allowing the crossarm 23 to move vertically and pivotally in the slot 30 of the main shaft 22, the main shaft 22 is provided with at least one auxiliary longitudinal slot 35 which is normal to and in communication with slot 30. The crossarm 23 is provided with a pin 34 extending laterally through and at right angles to the longitudinal axis of the crossarm 23 in a generally horizontal direction. The pin 34 is engaged in slot 35 thus preventing radial displacement of the crossarm 23 in relation to the main shaft 22 while allowing the crossarm 23 to move vertically or pivot in relation to the main shaft 22.

Mulling wheels 24 and 25 are rotatably positioned at the ends of the crossarm 23 and secured thereto by means of axle pins 36 and 37. The pins 36 and 37 have flat washerlike heads 38 and 39 that serve as collars to hold the mulling wheels 24 and 25 on the axle pins 36 and 37. The axle portions 40 and 41 of the pins 36 and 37 serve as bearing surfaces for the mulling wheels 24 and 25 as they rotate. Axial threaded apertures are defined on both ends of the crossarm 23 and these apertures receive threaded shank portions 42 and 43 of the pins 36 and 37. It is to be understood that other equivalent means such as pins or set screws can also be used to secure the pins 36 and 37 to the crossarm 23.

In order to mix the material in the pan 11, the mixer blades 26 and 27 are disposed with their lower edges scraping the bottom of the pan 11 during rotation. Moreover, the inner end of the inner mixer blade 26 is closely adjacent to and tangential to the concentric raised cylindrical portion 18 of the mixing pan 11 and extends outwardly toward the outer edge of the mulling wheel 24 as shown in FIG. 1. The blade 26 is supported with a brace 44 being fixedly attached thereto with cap screws 45. The brace 44 is rigidly attached to the main shaft 22 with cap screws 46 and outwardly and downwardly from the main shaft 22 to hold the blade 26 in the desired position. As the main shaft 22 is rotated in the direction of the arrow in FIG. 1, the blade 26 scrapes the bottom of the mixing pan 11 and moves material from the center thereof outwardly into the path of the muller wheels 24 and 25. The outer mixing blade 27 is disposed with the bottom edge thereof scraping the bottom of the mixing pan 11 and the outer end of the blade 27 in close proximity to the cylindrical side wall 14 of the mixing pan 11 as shown in FIG. 1. The blade 27 is supported with a brace 47 being fixedly attached thereto with cap screws 48. The brace 47 is rigidly attached to the main shaft 22 with cap screws 49 and extends outwardly and downwardly from the main shaft 22 to hold the blade 27 in the desired position. As the main shaft 22 is rotated, the blade 27 scrapes the bottom of the mixing pan 11 and also moves the material away from the outer edge 14 of the pan 11 inwardly into the path of the muller wheels 24 and 25.

Although the operation of the improved mulling and mixing machine is believed clear from the described detailed description, briefly, to operate the improved mulling and mixing machine the mixing and mulling head assembly 12 is securely engaged in the chuck 29 of a drill press or other power unit by means of the round shank portion 28 extending from the main shaft 22. The mixing pan 11 is filled with the desired amount and kind of material to be pulverized and mixed and the mixing pan 11 is then centered under the mulling and mixing head assembly with the centering means hereinbefore described and securely fastened to the support table of the drill press or other supporting means. Power is then supplied to the chuck 29 and the mulling and mixing action is begun. As the mulling and mixing head assembly 12 is rotated by the chuck 29, the mixing blades 26 and 27 scrape or sweep the bottom of the mixing pan 11 in a rotary motion. The inner mixing blade 26 moves the material away from the center portion of the mixing pan 11 into the path of the mulling wheels 24 and 25. The outer mixing blade 27 moves the material away from the cylindrical sides 14 of the mixing pan 11 inwardly into the path of the mulling wheels 24 and 25. In this manner the material is continuously being scraped off the bottom 13 and outwardly from the center of the pan and inwardly from the sides 14 of the pan into the mulling wheels 24 and 25 where it is pulverized. Because of the action of the mixing blades 26 and 27, no material is allowed to accumulate on the bottom 13, near the center or periphery of the mixing pan 11 and a continuous thorough mixing action is thus obtained regardless of the vertical movement of the mulling wheels 24 and 25 in relation to the bottom 13. As the main shaft 22 is rotated, the crossarm 23 is also rotated around the axis of the main shaft 22. The mulling wheels 24 and 25 press and grind the material against the bottom 13 of the mixing pan 11. Pressure between the mulling wheels 24 and 25 and the material is maintained by the weight of the wheels 24 and 25, the crossarm 23, the pins 34, 36 and 37, and the force that the spring 31 exerts on the crossarm 23. The mulling wheels 24 and 25 can move up and down relative to the mixing blades 26 and 27 and relative to each other because of novel slot and pin construction in the mixing head assembly 12. When the pulverizing and mixing is completed, the mixing head assembly 12 can be raised or the mixing pan can be lowered with the pan 11 then being removed and emptied or replaced with another; and the process repeated.

Figure 4:
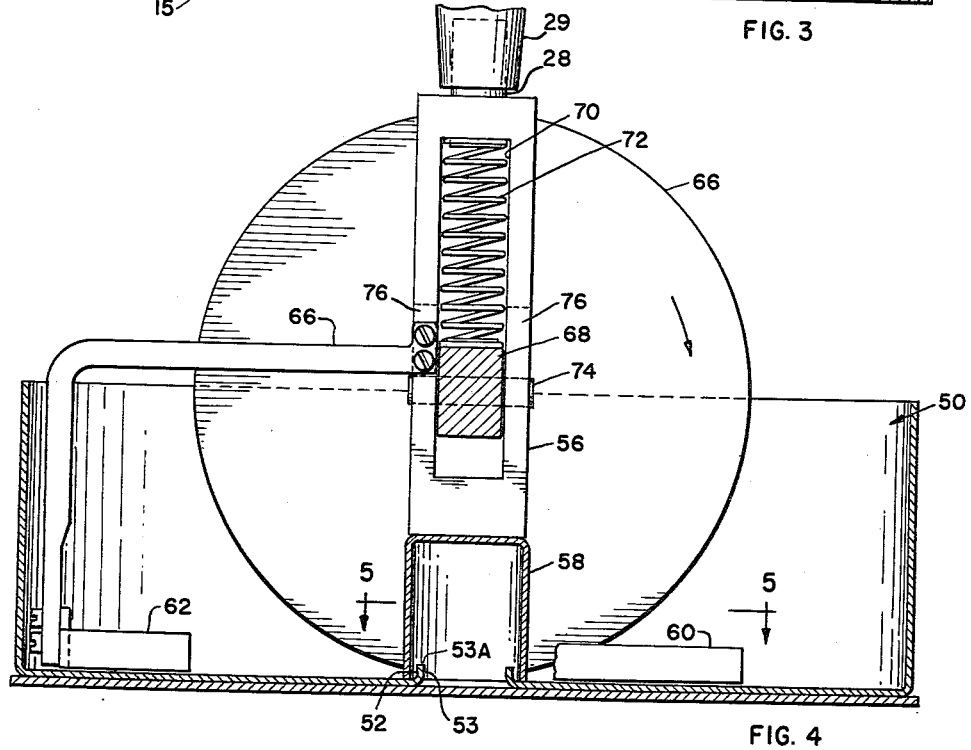
FIG. 4 is a side elevational view of a miniature mulling and mixing machine showing a different embodiment of the invention.
Figure 5:
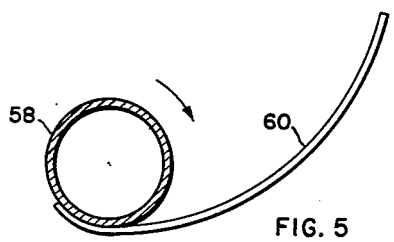
FIG. 5 is a partial sectional view of the embodiment of FIG. 4, taken substantially along line 5—5 of FIG. 4.

In the modified form of the invention as shown in FIGS. 4 and 5, a mixing pan or pan assembly 50 is provided with raised cylindrical portion 52 having a centrally located aperture 53, the edges 53a of the aperture being turned upwardly to form the portion 52. For the purpose of aligning the pan 50 with a main shaft 56, the main shaft 56 is provided with a cylindrical inverted cup-shaped downward extension 58 having an internal diameter slightly greater than the external diameter of the cylindrical portion 52 and rotatably receiving the portion 52, centering the pan 50 on the rotating axis of the main shaft 56. The cup-shaped extension 58 can be secured to the bottom of the main body portion of the main shaft 56 by any appropriate means such as by welding or by cap screws. Also, the central portion of the mixing pan 50 is kept devoid of material by the raised cylindrical portion 52 and the cylindrical downward extension 58, thus no dead space of material at the center of the mixing pan will occur. The main shaft 56 is provided with an upper round shank portion 28 which is adapted to be engaged with a chuck 29 of a drill press or other rotative power source in order that the main shaft can be rotated relative to the mixing pan 50.

In order to mix the material in the pan 50, an inner mixing blade 60 is fastened tangentially to the cylindrical downward extension 58, as shown in FIG. 5. A second or outer blade 62 is positioned adjacent the bottom of the pan 50 supported by a brace 66 extending from the main shaft. The bottom edge of the blades 60 and 62 rotate in close proximity to or touch the bottom surface of the mixing pan 50.

The embodiment of FIGS. 4 and 5 is additionally provided with mulling wheels 66 rotatably mounted at the ends of a cross arm 68 in a manner similar to that described in connection with the embodiment of FIGS. 1 to 3. Moreover, the crossarm 68 extends through a slot 70 in the main shaft 56 and is biased downwardly by a compression spring 72. The crossarm 68 is restrained from radial movement relative to the main shaft 56 through the cooperation of pin 74, which extends through the crossarm 68, and engages a pair of auxiliary longitudinal slots 76 defined in the side walls of the main shaft 56 which define the slot 70, in a manner similar to that shown and described in the embodiment of FIGS. 1 to 3.

While specific described embodiments of this invention have been illustrated, further modifications and improvements will occur to those skilled in the art. It is to be understood therefore that this invention is not limited to the particular form shown and it is intended in the appended claim to cover all such modifications as fall within the true spirit and scope of this invention.

What is claimed as new and desired to be secured by Letters Patent of the United States is:

A miniature mulling and mixing machine comprising a generally cylindrical mixing pan having a raised cylindrical center portion, a main shaft having a main body portion and a shank means for rotatable support by an external power source and extending axially upward from the main body portion thereof, alignment means for aligning said pan and said shaft in a radial direction only extending axially downwardly from the main body portion of said main shaft rotatably cooperating with said raised cylindrical portion, said main body portion being provided with a first longitudinal slot, a cross arm extending through said slot, a pair of rotatable mulling wheels secured on said crossarm, said main body portion being provided with at least one additional longitudinal slot communicating with said first slot, pin means secured to said crossarm intermediate its ends and positioned for vertical movement in the last-mentioned slot, spring means axially disposed in one of said slots of said main shaft and biasing said crossarm toward said pan, a plurality of mixing blades, and means connecting said blades to said shaft for positioning said blades outwardly from the axis of and in a fixed relation with said main shaft, said blades being rotatable therewith adjacent the bottom of said mixing pan independently of the position of said mulling wheel.

References Cited in the file of this patent
UNITED STATES PATENTS

| | | |
|---|---|---|
| 36,799 | Rowe | Oct. 28, 1862 |
| 112,395 | Thoss | Mar. 7, 1871 |
| 1,005,738 | Mowry | Oct. 10, 1911 |
| 2,676,760 | Simpson | Apr. 27, 1954 |
| 2,970,778 | McIlvaine | Feb. 7, 1961 |